(12) United States Patent
Sankar et al.

(10) Patent No.: US 8,948,805 B2
(45) Date of Patent: Feb. 3, 2015

(54) METHOD AND APPARATUS FOR RELIABLE TRANSMIT POWER AND TIMING CONTROL IN WIRELESS COMMUNICATION

(75) Inventors: Hari Sankar, College Station, TX (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1494 days.

(21) Appl. No.: 11/499,412

(22) Filed: Aug. 4, 2006

(65) Prior Publication Data
US 2007/0054691 A1 Mar. 8, 2007

Related U.S. Application Data

(60) Provisional application No. 60/711,986, filed on Aug. 26, 2005.

(51) Int. Cl.
| | |
|---|---|
| H04B 7/00 | (2006.01) |
| H04W 52/36 | (2009.01) |
| H04W 52/32 | (2009.01) |
| H04W 52/56 | (2009.01) |

(52) U.S. Cl.
CPC .......... *H04W 52/325* (2013.01); *H04W 52/362* (2013.01); *H04W 52/56* (2013.01)
USPC ............... 455/522; 455/69; 455/70; 370/315; 370/316; 370/317; 370/318; 370/319

(58) Field of Classification Search
USPC ............ 455/522, 67.11, 115.1, 115.2, 69–70; 370/337, 335, 315–320
See application file for complete search history.

(56) References Cited

U.S. PATENT DOCUMENTS

| | | | |
|---|---|---|---|
| 6,208,873 B1 | 3/2001 | Black et al. | |
| 6,343,218 B1 | 1/2002 | Kaneda et al. | |
| 6,400,929 B1 * | 6/2002 | Ue et al. ........................ | 455/69 |
| 6,683,908 B1 * | 1/2004 | Cleveland .................... | 375/148 |

(Continued)

FOREIGN PATENT DOCUMENTS

| | | |
|---|---|---|
| EP | 0975185 | 1/2000 |
| JP | 9312881 A | 12/1997 |

(Continued)

OTHER PUBLICATIONS

Universal Mobile Telecommunications System (UMTS); Multiplexing and channel coding (TDD) 3GPP TS 25.221 version 6.5.0 Release 6.
Universal Mobile Telecommunications System (UMTS); Multiplexing and channel coding (TDD) 3GPP TS 25.222 version 6.2.0 Release 6.
Mobile Station-Base Station Compatibility Standard for Wideband Spread Spectrum Cellular Systems.

(Continued)

*Primary Examiner* — Fayyaz Alam
(74) *Attorney, Agent, or Firm* — Rupit M. Patel

(57) ABSTRACT

Techniques for improving reliability of control information are described. A transmitter determines if improved reliability is applicable for at least one control symbol to be sent in a timeslot. The transmitter sends the control symbol(s) without improved reliability if deemed not applicable and with improved reliability if deemed applicable. A receiver receives the control symbol(s) and identifies each received control symbol as a reliable control symbol or an unreliable control symbol based on the received signal quality of the received control symbol and a threshold. The receiver adjusts a control loop based on reliable control symbols. The receiver also combines unreliable control symbols to obtain combined symbols and selectively adjusts the control loop based on the combined symbols. The control loop may be for transmit power or timing.

30 Claims, 8 Drawing Sheets

(56) References Cited

U.S. PATENT DOCUMENTS

| | | | |
|---|---|---|---|
| 6,760,598 B1* | 7/2004 | Kurjenniemi | 455/522 |
| 6,950,406 B2* | 9/2005 | Chen et al. | 370/252 |
| 7,180,881 B2 | 2/2007 | DiFazio | |
| 7,340,268 B2 | 3/2008 | Oh et al. | |
| 7,639,659 B2 | 12/2009 | Ha et al. | |
| 2001/0041540 A1* | 11/2001 | Tiedemann et al. | 455/69 |
| 2002/0077064 A1 | 6/2002 | Ue et al. | |
| 2003/0063576 A1* | 4/2003 | DiFazio | 370/280 |
| 2004/0120411 A1* | 6/2004 | Walton et al. | 375/260 |
| 2004/0166884 A1* | 8/2004 | Oh et al. | 455/522 |
| 2004/0223473 A1* | 11/2004 | Ha et al. | 370/335 |
| 2005/0037761 A1* | 2/2005 | Baker et al. | 455/442 |

FOREIGN PATENT DOCUMENTS

| | | |
|---|---|---|
| JP | 10023529 A | 1/1998 |
| JP | 2000049663 | 2/2000 |
| JP | 2000341210 A | 12/2000 |
| JP | 2005073162 A | 3/2005 |
| WO | WO9937111 A1 | 7/1999 |
| WO | WO0031893 | 6/2000 |
| WO | WO2004100569 A2 | 11/2004 |

OTHER PUBLICATIONS cdma2000 High Rate Packet Data Air Interface.

"Telecommunications Industry Association, ""Introduction to cdma2000 Spread Spectrum Systems—Addendum 1,""Jan. 2006".

International Search Report and Written Opinion—PCT/US06/033240, International Search Authority—European Patent Office—Mar. 19, 2007.

Taiwan Search Report—TW095131452—TIPO—Apr. 20, 2011.

Universal Mobile Telecommunications System (UMTS); Multiplexing and channel coding (TDD) 3GPP TS 25.221 version 6.5.0 Release 6, Dec. 10, 2004.

Universal Mobile Telecommunications System (UMTS); Multiplexing and channel coding (TDD) 3GPP TS 25.222 version 6.2.0 Release 6, Dec. 10, 2004.

"Telecommunications Industry Association, ""Introduction to cdma2000 Spread Spectrum Systems—Addendum 1,"" Jan. 2006".

cdma2000 High Rate Packet Data Air Interface Specification, TIA-856-A (Revision of TIA/EIA/IS-856), Apr. 2004.

TIA/EIA-95-B: "Mobile Station-Base Station Compatibility Standard for Wideband Spread Spectrum Cellular Systems," TIA/EIA Interim Standard, Feb. 3, 1999, XP002145331, pp. 6-380.

* cited by examiner

METHOD AND APPARATUS FOR RELIABLE TRANSMIT POWER AND TIMING CONTROL IN WIRELESS COMMUNICATION

CLAIM OF PRIORITY UNDER 35 U.S.C. §119

The present Application for Patent claims priority to Provisional Application Ser. No. 60/711,986, entitled "METHOD AND APPARATUS FOR RELIABLE POWER CONTROL IN WIRELESS COMMUNICATIONS," filed Aug. 26, 2005, assigned to the assignee hereof, and expressly incorporated herein by reference.

BACKGROUND

I. Field

The present disclosure relates generally to communication, and more specifically to techniques for controlling transmit power in wireless communication.

II. Background

In a wireless multiple-access communication system, a base station may communicate with multiple terminals (e.g., cellular phones) on the downlink and uplink. The downlink (or forward link) refers to the communication link from the base stations to the terminals, and the uplink (or reverse link) refers to the communication link from the terminals to the base stations.

To reduce interference and improve system capacity, power control may be used for the downlink and uplink. Downlink power control may entail adjusting the transmit power of a downlink transmission to each terminal to achieve a target received signal quality at the terminal. Received signal quality may be quantified by signal-to-interference-plus-noise ratio (SINR), signal-to-noise ratio (SNR), energy-per-symbol-to-total-noise ratio (Es/Nt), or some other measure. For clarity, SINR is used for received signal quality in much of the description below. Similarly, uplink power control may entail adjusting the transmit power of an uplink transmission from each terminal to achieve a target SINR at the base station. For each link, the target SINR may be adjusted to achieve the desired level of performance, which may be quantified by a target frame error rate (FER) or some other performance metric.

The transmit power adjustment for a given link may be achieved by estimating a received SINR at a receiver, comparing the received SINR against the target SINR, generating a transmit power control (TPC) command based on the comparison result, and sending the TPC command to a transmitter. The transmitter then adjusts the transmit power either up or down based on the received TPC command. The accuracy of the transmit power adjustment is dependent on the reliability of the received TPC command.

A communication system may impose certain constraints on how TPC commands may be sent, as described below. These constraints may adversely impact the reliability of the received TPC commands. There is therefore a need in the art for techniques to achieve reliable power control in such a communication system.

SUMMARY

According to an embodiment of the invention, an apparatus comprises at least one processor to receive a control symbol in a burst sent with variable transmit power, to determine reliability of the control symbol based on received signal quality of the control symbol and a threshold, to adjust a control loop if the control symbol is deemed reliable, and to maintain the control loop if the control symbol is deemed unreliable; and a memory coupled to the at least one processor.

Another embodiment includes a method comprising receiving a control symbol in a burst sent with variable transmit power; determining reliability of the control symbol based on received signal quality of the control symbol and a threshold; adjusting a control loop if the control symbol is deemed reliable; and maintaining the control loop if the control symbol is deemed unreliable.

Another embodiment includes an apparatus comprising means for receiving a control symbol in a burst sent with variable transmit power; means for determining reliability of the control symbol based on received signal quality of the control symbol and a threshold; means for adjusting a control loop if the control symbol is deemed reliable; and means for maintaining the control loop if the control symbol is deemed unreliable.

Another embodiments includes a processor readable media for storing instructions operable to receive a control symbol in a burst sent with variable transmit power; determine reliability of the control symbol based on received signal quality of the control symbol and a threshold; adjust a control loop if the control symbol is deemed reliable; and maintain the control loop if the control symbol is deemed unreliable.

Another embodiment includes an apparatus comprising at least one processor to receive control symbols, to identify each received control symbol as a reliable control symbol or an unreliable control symbol, to adjust a control loop based on reliable control symbols, to combine unreliable control symbols to obtain combined symbols, and to selectively adjust the control loop based on the combined symbols; and a memory coupled to the at least one processor.

Another embodiment includes a method comprising receiving control symbols; identifying each received control symbol as a reliable control symbol or an unreliable control symbol; adjusting a control loop based on reliable control symbols; combining unreliable control symbols to obtain combined symbols; and selectively adjusting the control loop based on the combined symbols.

Another embodiment includes an apparatus comprising means for receiving control symbols; means for identifying each received control symbol as a reliable control symbol or an unreliable control symbol; means for adjusting a control loop based on reliable control symbols; means for combining unreliable control symbols to obtain combined symbols; and means for selectively adjusting the control loop based on the combined symbols.

Another embodiment includes a processor readable media for storing instructions operable to receive control symbols; identify each received control symbol as a reliable control symbol or an unreliable control symbol; adjust a control loop based on reliable control symbols; combine unreliable control symbols to obtain combined symbols; and selectively adjust the control loop based on the combined symbols.

Another embodiment includes an apparatus comprising at least one processor to determine if improved reliability is applicable for at least one control symbol to be sent in a timeslot, to send the at least one control symbol without improved reliability if deemed not applicable, and to send the at least one control symbol with improved reliability if deemed applicable; and a memory coupled to the at least one processor.

Another embodiment includes a method comprising determining if improved reliability is applicable for at least one control symbol to be sent in a timeslot; sending the at least one control symbol without improved reliability if deemed not applicable; and sending the at least one control symbol with improved reliability if deemed applicable.

Another embodiment includes an apparatus comprising means for determining if improved reliability is applicable for at least one control symbol to be sent in a timeslot; means for sending the at least one control symbol without improved reliability if deemed not applicable; and means for sending the at least one control symbol with improved reliability if deemed applicable.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
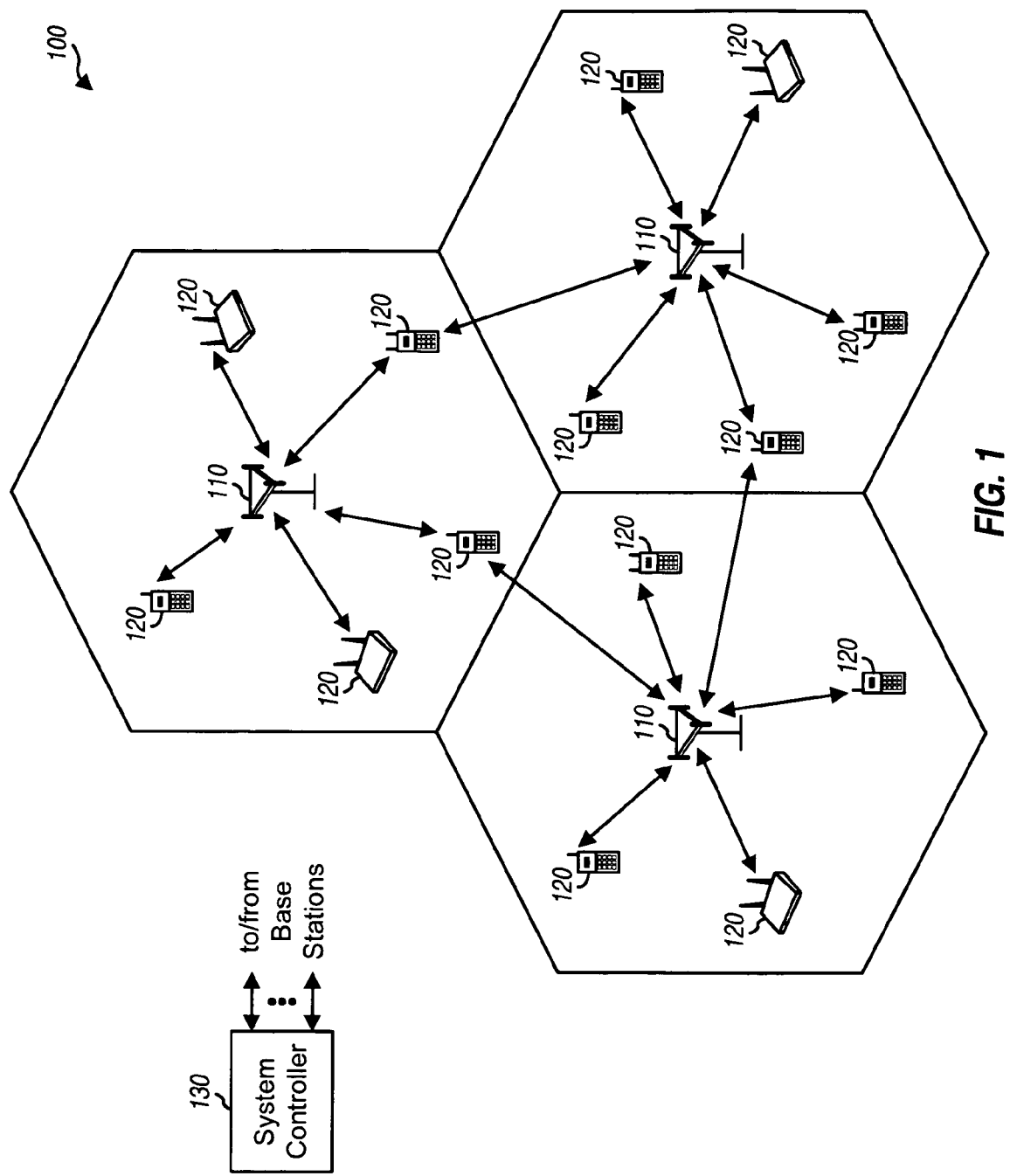
FIG. 1 shows a multiple-access communication system.

FIG. 1 shows a multiple-access communication system 100 with multiple base stations 110 and multiple terminals 120. A base station is generally a fixed station that communicates with the terminals and may also be called a Node B, an access point, or some other terminology. Each base station 110 provides communication coverage for a particular geographic area. A system controller 130 couples to base stations 110 and provides coordination and control for these base stations.

A terminal may be stationary or mobile and may also be called a user equipment, a mobile station, or some other terminology. A terminal may communicate with zero, one, or multiple base stations at any given moment. A terminal may be a cellular phone, a personal digital assistant (PDA), a subscriber unit, a wireless modem, a wireless device, and so on. In the following description, the terms "terminal" and "user" are used interchangeably.

The techniques described herein may be used for various wireless communication systems such as Code Division Multiple Access (CDMA) systems, Time Division Multiple Access (TDMA) systems, Frequency Division Multiple Access (FDMA) systems, and Orthogonal FDMA (OFDMA) systems. A CDMA system may implement a radio technology such as cdma2000, Universal Terrestrial Radio Access (UTRA) Time Division Duplex (TDD), or UTRA Frequency Division Duplex (FDD). cdma2000 covers IS-2000, IS-95 and IS-856 standards. UTRA TDD includes 1.28, 3.84 and 7.68 Mcps Options. UTRA TDD 3.84 and 7.68 Mcps Options are also referred to as Time Division CDMA (TD-CDMA) or High Chip Rate (HCR). UTRA TDD 1.28 Mcps Option is also referred to as Time Division Synchronous CDMA (TD-SCDMA) or Low Chip Rate (LCR). UTRA FDD is also referred to as Wideband-CDMA (W-CDMA). A TDMA system may implement a radio technology such as Global System for Mobile Communications (GSM). UTRA TDD, UTRA FDD and GSM are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, the techniques are described below for UTRA TDD LCR.

Figure 2:
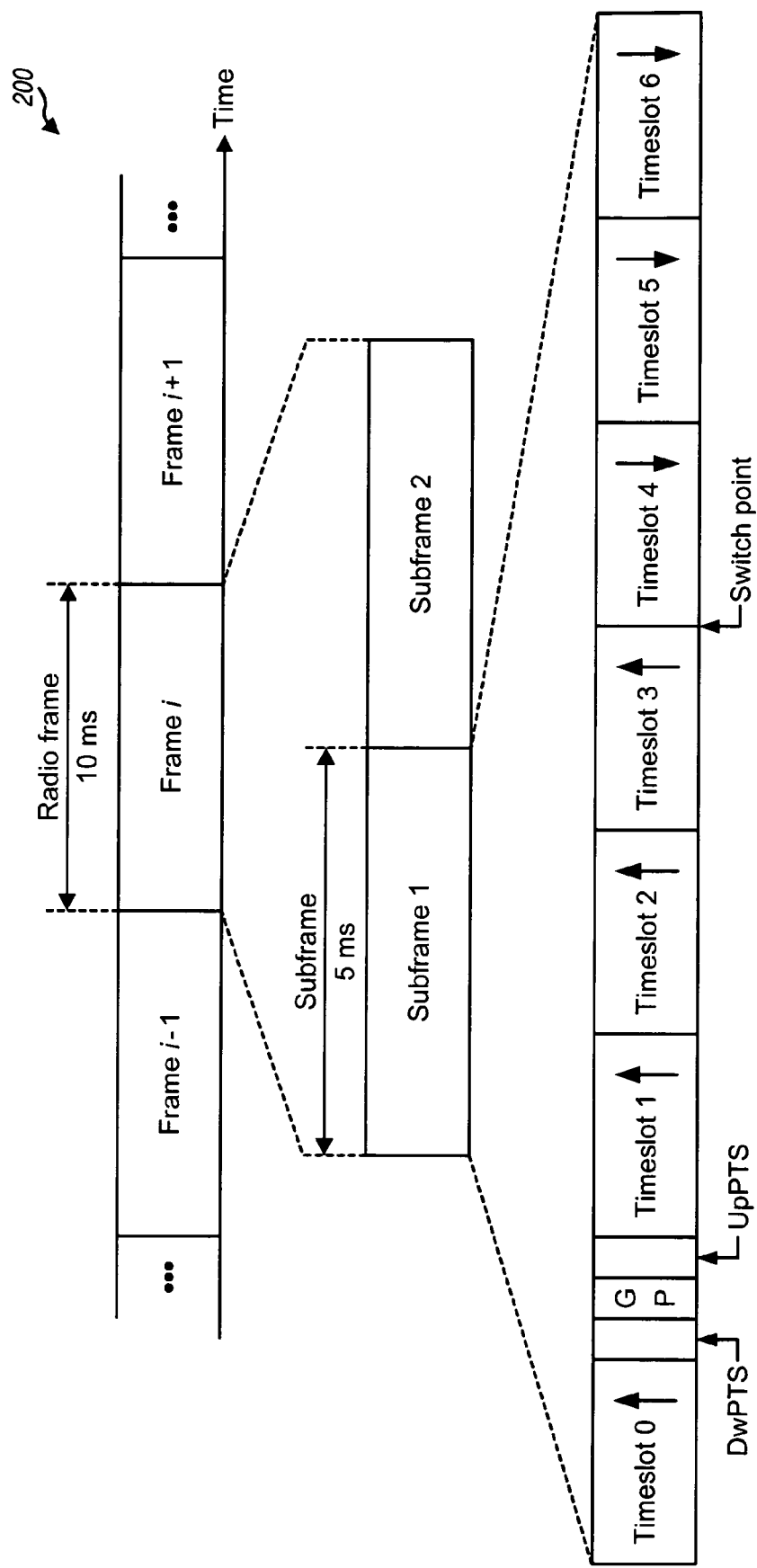
FIG. 2 shows a three-layer frame structure in UTRA TDD LCR.

FIG. 2 shows a three-layer frame structure 200 in UTRA TDD LCR. The transmission time line is partitioned into frames, with each frame being identified by a system frame number (SFN). Each frame has a duration of 10 milliseconds (ms) and is partitioned into two subframes 1 and 2. Each subframe has a duration of 5 ms and is partitioned into seven timeslots 0 through 6, a downlink pilot time slot (DwPTS), an uplink pilot time slot (UpPTS), and a guard period (GP). Timeslot 0 is used for the downlink, timeslot 1 is used for the uplink, and timeslots 2 through 6 may be used for the downlink and/or uplink, as determined by a switch point.

Each timeslot may be assigned to one or multiple users. A transmission for a user in a timeslot is referred to as a burst. A burst may carry traffic data, signaling, transport format combination indicator (TFCI), transmit power control (TPC), synchronization shift (SS), or a combination thereof. The TFCI indicates a data rate of a data frame. This data rate is associated with various parameters such as, e.g., a frame size, a code rate, a modulation scheme, etc. The TPC information is used for transmit power adjustment. The SS information is used for timing adjustment so that bursts from different terminals arrived aligned in time at a base station. Various burst formats are defined in UTRA TDD.

Figure 3:
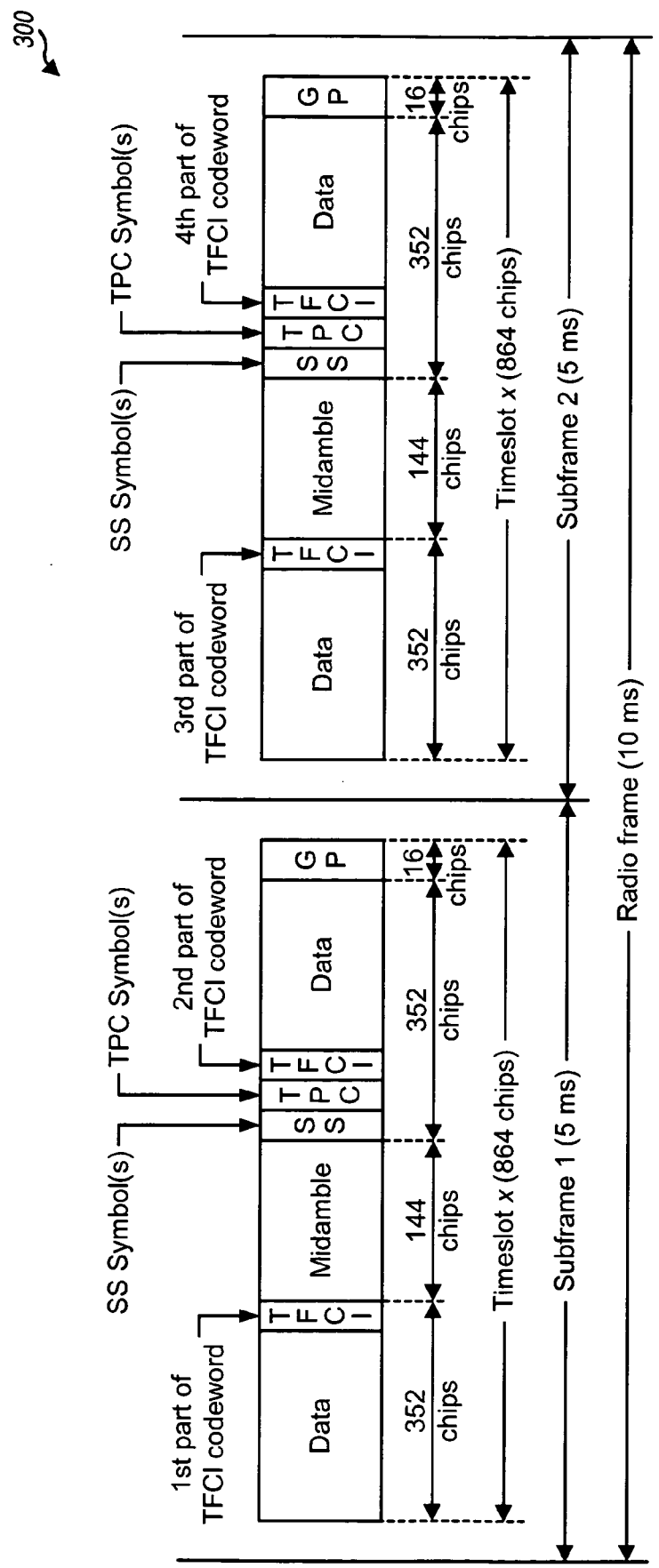
FIG. 3 shows a burst format in UTRA TDD LCR.

FIG. 3 shows a burst format 300 for the case in which a burst carries TFCI, TPC, and SS information. Burst format 300 may be used for the downlink and uplink. Burst format 300 covers two bursts to be sent in two timeslots, one timeslot in subframe 1 and another timeslot in subframe 2. Each burst includes a first data field, a midamble field, a second data field, and a guard period (GP). The four fields of each burst have the lengths (in chips) shown in FIG. 3.

The four data fields of the two bursts carry data symbols for a data frame. A TFCI codeword is partitioned into four parts, which are mapped to the four data fields at the locations shown in FIG. 3. SS symbol(s) and TPC symbol(s) may also be mapped to the second data field of each burst at the locations shown in FIG. 3.

On the uplink in UTRA TDD, all of the symbols in a timeslot are spread with the same Walsh code. This Walsh code has a spreading factor of SF, which may be 1, 2, 4, 8 or 16. The spreading factor determines the number of times a given symbol is replicated and sent in the timeslot. The spreading factor is thus one factor that determines the reliability of the symbol. Since the number of chips in a timeslot is fixed, the spreading factor determines the number of symbols that can be sent in the timeslot. In particular, a timeslot can carry $N_T=704/SF$ symbols in the two data fields of the timeslot, or 704 symbols for SF=1, 352 symbols for SF=2, 176 symbols for SF=4, 88 symbols for SF=8, and 44 symbols for SF=16. The TFCI, TPC, SS, and data symbols have the same spreading factor on the uplink.

On the downlink, the TPC and SS symbols are spread with Walsh codes of SF=16 whereas the other symbols may be spread with Walsh codes of SF=1 or 16.

Table 1 gives the allowable number of TPC symbols and the allowable number of SS symbols in a timeslot. For case 1 in Table 1, a timeslot includes SF chips for TPC and SF chips for SS. For case 3, a timeslot includes 16 chips for TPC and 16 chips for SS. For case 3, one TPC or SS symbol is replicated 16/SF times and sent in 16 chips.

TABLE 1

| Case | Number TPC symbols/timeslot | Case | Number SS symbols/timeslot |
|---|---|---|---|
| 1 | one TPC symbol | 1 | one SS symbol |
| 2 | no TPC symbol | 2 | no SS symbol |
| 3 | 16/SF TPC symbols | 3 | 16/SF SS symbols |

The TPC symbols and SS symbols are sent without encoding. A TPC symbol may be a Down TPC command to decrease transmit power or an Up TPC command to increase transmit power. An SS symbol may be a Down SS command to decrease synchronization shift by k/8 chips, an Up SS command to increase synchronization shift by k/8 chips, or a Do nothing SS command for no change, where k is a value that is signaled by the system. The TPC and SS symbols are sent with the same spreading factor and transmit power. The tri-level SS symbols thus have worse reliability than the bi-level TPC symbols.

In UTRA TDD, a terminal may be assigned a dedicated traffic channel (DTCH) and a dedicated control channel (DCCH) for each of the downlink and uplink. The DTCH carries traffic data, e.g., for voice, packet data, and so on. One data frame may be sent on the DTCH in each transmission time interval (TTI), which may be 20 ms or some other duration. A data frame may also be referred to as a packet, a data codeword, a data block, and so on. Each data frame is processed and mapped to four bursts sent in four timeslots. The DCCH carries signaling. One control frame may be sent on the DCCH in each 40 ms interval. Each control frame is processed and mapped to eight bursts sent in eight timeslots. The data fields of a burst may carry only data symbols for the DTCH if the DCCH is not sent. The data fields may carry both data symbols for the DTCH and signaling symbols for the DCCH if the DCCH is sent. The total number of symbols in a timeslot is fixed and determined by the spreading factor. The number of data symbols ($N_D$) that can be sent in the timeslot is determined by the total number of symbols ($N_T$) in the timeslot, the number of signaling symbols (if any) sent in the timeslot, and the number of TPC and SS symbols (if any) being sent.

A terminal may receive traffic data at different data rates for transmission on the uplink. As an example, the terminal may have a voice call and may receive voice frames generated by an adaptive multi-rate (AMR) speech codec at data rates ranging from 12.2 to 4.75 kilo-bits per second (kbps). The terminal may also receive silence descriptor (SID) frames during periods of silence (e.g., pauses) and Null frames. A 12.2 k frame carries 244 bits, a 4.75 k frame carries 95 bits, a SID frame may carry 37 or more bits, and a Null frame carries zero bits. Each data frame may be sent in four timeslots. The terminal may process each data frame with a suitable code rate to generate $4N_D$ data symbols for transmission in four timeslots. The terminal may use different code rates for data frames of different data rates.

Each code rate is associated with a specific minimum SINR required to achieve a target level of performance, e.g., 1% FER. Different transmit power levels may be used for data frames encoded with different code rates. A data frame with a higher data rate may be encoded with a higher code rate having less redundancy and may be sent at a higher transmit power level to achieve the target FER. Conversely, a data frame with a lower data rate may be encoded with a lower code rate having more redundancy and may be sent at a lower transmit power level to achieve the same target FER. The lower transmit power level reduces interference and potentially increases system capacity.

Table 2 gives power offsets in units of decibel (dB) for different voice rates for the case with DCCH and the case without DCCH. When the DCCH is sent, a SID frame may be transmitted with 4.5 dB less power than a 12 k frame, and a Null frame may be transmitted with 6.4 dB less power than a 12 k frame for the same target FER. The 12 k, SID and Null frames without DCCH may be transmitted at lower power than the 12 k, SID and Null frames with DCCH.

TABLE 2

| Combination | Power Offset (dB) | Combination | Power Offset (dB) |
|---|---|---|---|
| 12k/DCCH | 0 | 12k | −0.8 |
| SID/DCCH | −4.5 | SID | −7.3 |
| Null/DCCH | −6.4 | Null | −11.9 |

In UTRA TDD, all symbols of a timeslot are transmitted at the same power level. There is no provision in the current UTRA TDD standard to boost/de-boost the power of a particular symbol to improve its reliability. This is a potential problem when the transmit power level is varied in accordance with the data rates of the data frames. The transmit power level may be reduced when transmitting a lower rate data frame. However, Layer 1 information (e.g., TFCI, TPC and SS symbols) would also be transmitted at the lower power level. This lower power level may be sufficient to decode the data frame, which is encoded with a low code rate, but may not be sufficient to decode the Layer 1 information, which is usually uncoded or coded with a weak code.

The lower transmit power level may result in less reliability for TPC and SS symbols. Computer simulations were performed to determine TPC and SS symbol error rates (SERs) for the case without DCCH, which has lower power levels for SID and Null frames. For an AWGN channel, the SER is approximately 4% for 12 k frames, 13% for SID frames, and 16% for Null frames. The high TPC and SS SERs for both SID and Null frames may adversely impact the performance of power control and time tracking, respectively.

The reliability of control symbols (e.g., TFCI, TPC and SS symbols) may be improved in several manners. In one embodiment, a control symbol is repeated, spread with multiple Walsh codes, combined, and transmitted in the location designated for that control symbol. For example, a TPC symbol may be replicated twice, the first TPC symbol may be spread with a first Walsh code, the second TPC symbol may be spread with a second Walsh code, and the two spread TPC symbols may be combined and transmitted in the original TPC symbol location. The use of two Walsh codes improves the SINR of the TPC symbol by approximately 3 dB. In another embodiment, a control symbol is repeated and sent in multiple locations of a timeslot. In yet another embodiment, a control symbol is repeated and sent in multiple timeslots. For example, a TPC symbol may be sent in a timeslot of subframe 1 and also in another timeslot of subframe 2. In this case, the TPC feedback rate is reduced by a factor of two. This embodiment may provide more time diversity than sending the control symbol in multiple locations of the same timeslot. In yet another embodiment, a control symbol is transmitted at a power level that allows for reliable reception of the control symbol. In this embodiment, the transmit power of the control symbol may be maintained approximately constant even when the transmit power of the data symbols is varied from timeslot to timeslot. In yet another embodiment, a control symbol is encoded with a block code to generate a codeword, and the codeword is transmitted for the control symbol.

In an embodiment, control symbols are transmitted with improved reliability only when needed. Power offsets may be determined for all supported data rates, e.g., as shown in Table 2. Improved reliability may be used for the control symbols for one or more data rates based on their power offsets. For example, improved reliability may be applied only to Null frames having the largest power offset. Improved reliability may also be applied to SID frames and/or frames of other data rates. In another embodiment, improved reliability is applied for all supported data rates.

Figure 4:
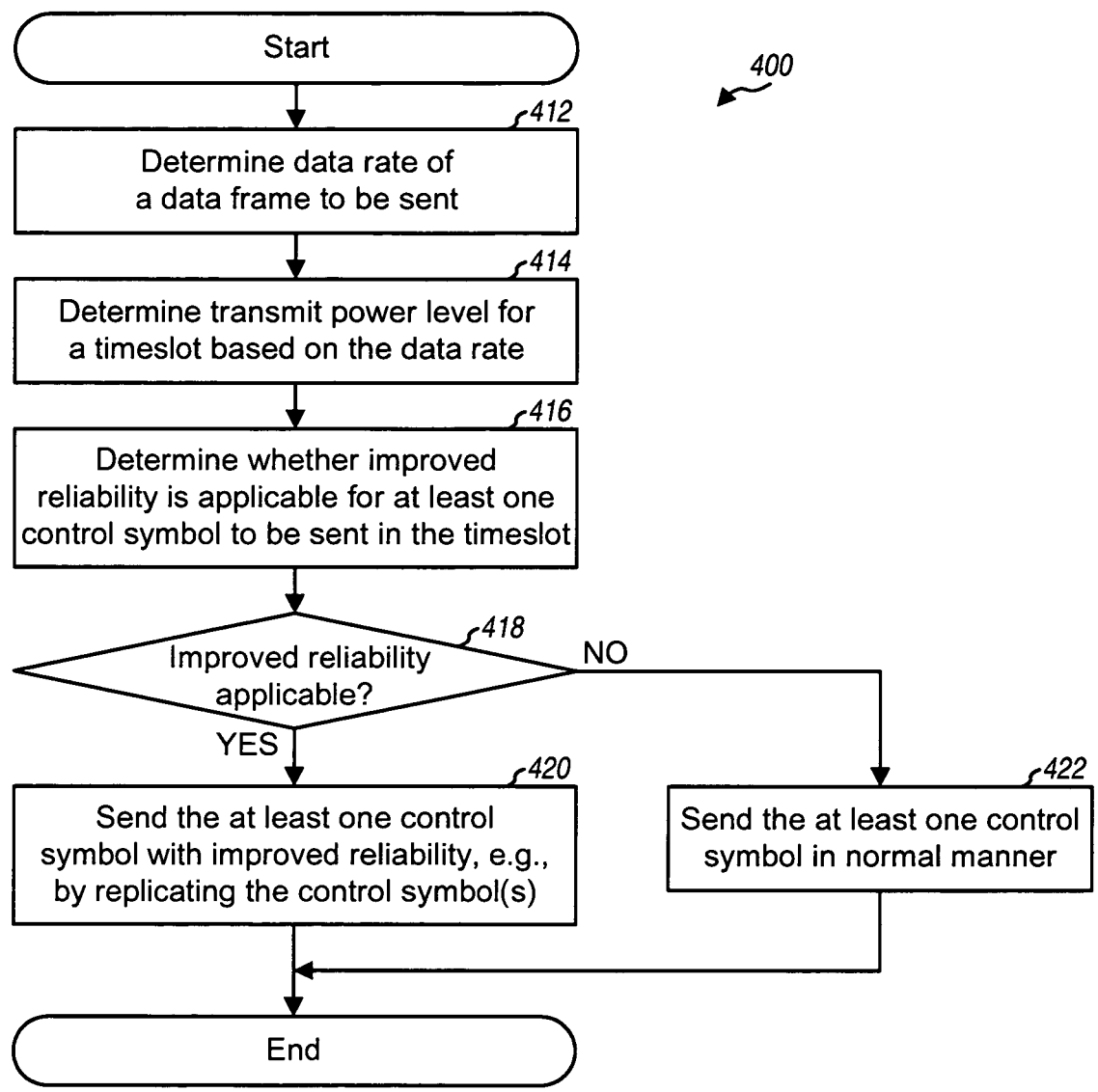
FIG. 4 shows a process for sending control symbols.

FIG. 4 shows an embodiment of a process 400 for sending control symbols, e.g., TFCI, TPC, and/or SS symbols. A data frame is received for transmission and the data rate of the data frame is determined (block 412). The transmit power level for a timeslot is determined based on the data rate and the current transmit power level (block 414). A determination is then made whether improved reliability is applicable for at least one control symbol to be sent in the timeslot (block 416). For example, improved reliability may be applicable if the transmit power level or the data rate is below a threshold. If improved reliability is applicable, as determined in block 418, then the control symbol(s) are sent with improved reliability (block 420). This may entail replicating the control symbol(s) and sending multiple copies of the control symbol(s). Other embodiments described above may also be used for block 420. If improved reliability is not applicable, then the control symbol(s) are sent in the normal manner (block 422). In any case, the control symbol(s) and data symbols may be sent at the transmit power level determined for the timeslot.

A receiver obtains all copies of the control symbol(s) sent for a given data frame. The receiver may combine all copies to obtain received control symbol(s) for the data frame. In one embodiment, the receiver performs simple averaging and coherently sums the copies on a symbol-by-symbol basis. In another embodiment, the receiver performs maximal ratio combining (MRC), weighs the symbols for each copy based on the received SINR of that copy, and sums the weighted symbols of all copies, symbol-by-symbol. MRC gives greater weight to copies with higher received SINRs, which may improved the quality of the resultant received control symbol(s).

The embodiments described above may be used to improve the reliability of control symbols when data is sent at variable transmit power, e.g., due to variations in voice activity during a voice call. These embodiments may be applied to any or all of the control symbols, e.g., TFCI, TPC and SS symbols. TPC and SS performance may be further improved using the techniques described below. For clarity, the techniques are specifically described for downlink power control. These techniques may also be used for uplink power control as well as timing control.

Figure 5:
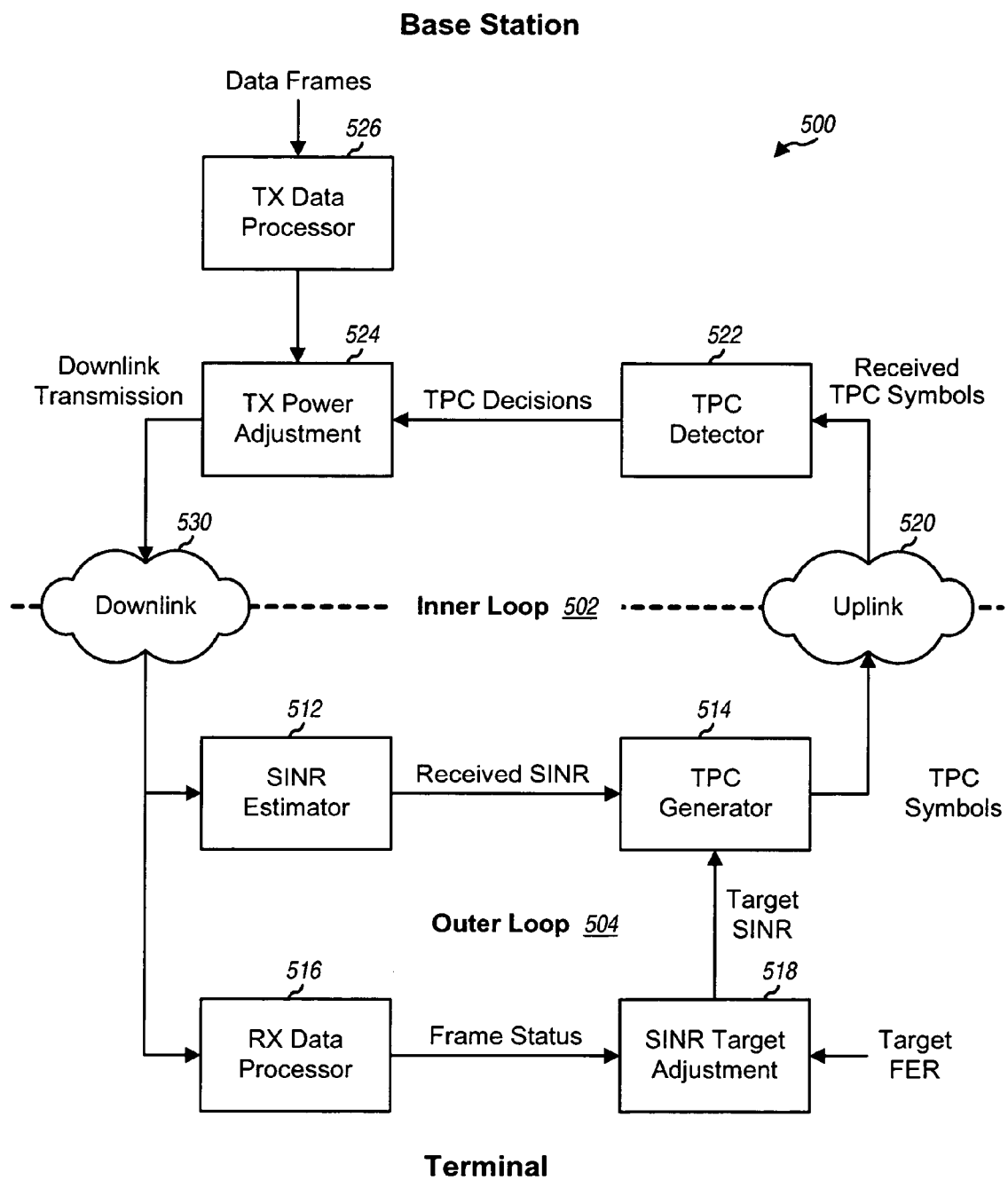
FIG. 5 shows a downlink power control mechanism.

FIG. 5 shows a downlink power control mechanism 500 that adjusts the transmit power of a downlink transmission from a base station to a terminal. Power control mechanism 500 includes an inner loop 502 and an outer loop 504.

Inner loop 502 attempts to maintain the received SINR for the downlink transmission as close as possible to a target SINR. In each timeslot allocated for the terminal, an SINR estimator 512 estimates the received SINR of the downlink transmission and provides the received SINR to a TPC generator 514. TPC generator 514 also receives the target SINR from an adjustment unit 518, compares the received SINR against the target SINR, and generates a TPC symbol based on the comparison result. The TPC symbol is sent on the uplink (cloud 520) to the base station. The base station processes the uplink transmission from the terminal and obtains a received TPC symbol in each timeslot allocated to the terminal. A TPC detector 522 detects each received TPC symbol and provides a TPC decision, which indicates whether an Up command or a Down command was detected. A transmitter unit 524 then adjusts the transmit power for the downlink transmission based on the TPC decision.

Due to path loss and fading on the downlink (cloud 530), which typically vary over time and especially for a mobile terminal, the received SINR at the terminal continually fluctuates. Inner loop 502 attempts to maintain the received SINR at or near the target SINR in the presence of changes in the downlink.

Outer loop 504 continually adjusts the target SINR such that the target FER is achieved for the downlink transmission. A transmit (TX) data processor 526 receives and processes data frames for transmission on the downlink. A receive (RX) data processor 516 processes the downlink transmission and decodes the received data frames. RX data processor 516 further checks each decoded frame, determines whether the frame was decoded correctly (good) or in error (erased), and provides the status of each decoded frame. An adjustment unit 518 receives the frame status and the target FER and determines the target SINR. Adjustment unit 518 may decrease the target SINR by a ΔDN step for each frame decoded correctly (or good frame) and increase the target SINR by a ΔUP step for each frame decoded in error (or good frame). The ΔUP and ΔDN steps may be selected based on the target FER, as follows:

$$\Delta DN = \Delta UP \cdot \left( \frac{\text{Target } FER}{1 - \text{Target } FER} \right). \quad \text{Eq (1)}$$

The ΔUP and ΔDN steps may also be determined based on the desired rate of convergence for the outer loop.

FIG. 5 shows an exemplary downlink power control mechanism. An uplink power control mechanism to adjust the transmit power of an uplink transmission from the terminal to the base station may be implemented in similar manner. The base station may thus implement blocks 522 through 526 for downlink power control and may implement blocks 512 through 518 for uplink power control. The terminal may implement blocks 512 through 518 for downlink power control and may implement blocks 522 through 526 for uplink power control.

A power control mechanism works well if the TPC symbols can be reliability detected, so that the transmit power can be adjusted in the right direction. Higher error rates may be encountered for the TPC symbols in timeslots with lower transmit power. TPC performance may be improved in various manners.

In an embodiment, the transmit power is adjusted only when a received TPC symbol is deemed to be reliable and is maintained otherwise. The reliability of a received TPC symbol may be quantified in various manners and based on various metrics. In an embodiment, a received TPC symbol is deemed as reliable if the received SINR of that TPC symbol exceeds an SINR threshold and is deemed as unreliable otherwise. The SINR threshold may be determined in various manners.

In an embodiment, the SINR threshold for received TPC symbols is dynamically set based on the target SINR for data frames. For a given operating scenario (e.g., channel model, burst format, and code/data rate), a certain SINR is required to achieve a target FER (e.g., 1% FER) for the data frames, and another SINR is required to achieve a target SER (e.g., 6% SER) for the TPC symbols. The difference between these two required SINRs is referred to as the coding gain. It can be shown that the coding gain is fairly constant over different SERs and across most channel models.

The target SINR may be adjusted based on the status of received data frames to achieve the target FER. The SINR threshold may then be set as follows:

SINR Threshold=Target SINR+Coding Gain.  Eq (2)

The coding gain is dependent on various factors such as the data rate of a data frame, the burst format (which determines the number of data symbols and TPC symbols in a timeslot), the target FER for the data frames, and the target SER for the TPC symbols. Table 3 shows the coding gain for 12 k, SID, and Null frames for one exemplary operating scenario with 1% FER and 6% SER.

TABLE 3

| Combination | Coding Gain (dB) |
|---|---|
| 12k | −1.6 |
| SID | 2.5 |
| Null | 4.5 |

The coding gain may be determined for all data rates and all operating scenarios of interest and stored in a look-up table. Thereafter, a suitable coding gain may be obtained from the look-up table for each received data frame and used to generate the SINR threshold for that frame.

In another embodiment, the SINR threshold is a fixed value that may be determined via computer simulation, empirical measurements, and so on. It can be shown that the SINR required for a given SER is fairly robust for uncoded symbols in different channel models. The required SINR is approximately 1.3 dB for 6% SER when a TPC symbol is transmitted once and approximately −1.7 dB when the TPC symbol is transmitted twice, e.g., with two Walsh codes or in two timeslots. The required SINR for the target SER may be determined and used as the SINR threshold for reliability detection.

Figure 6:
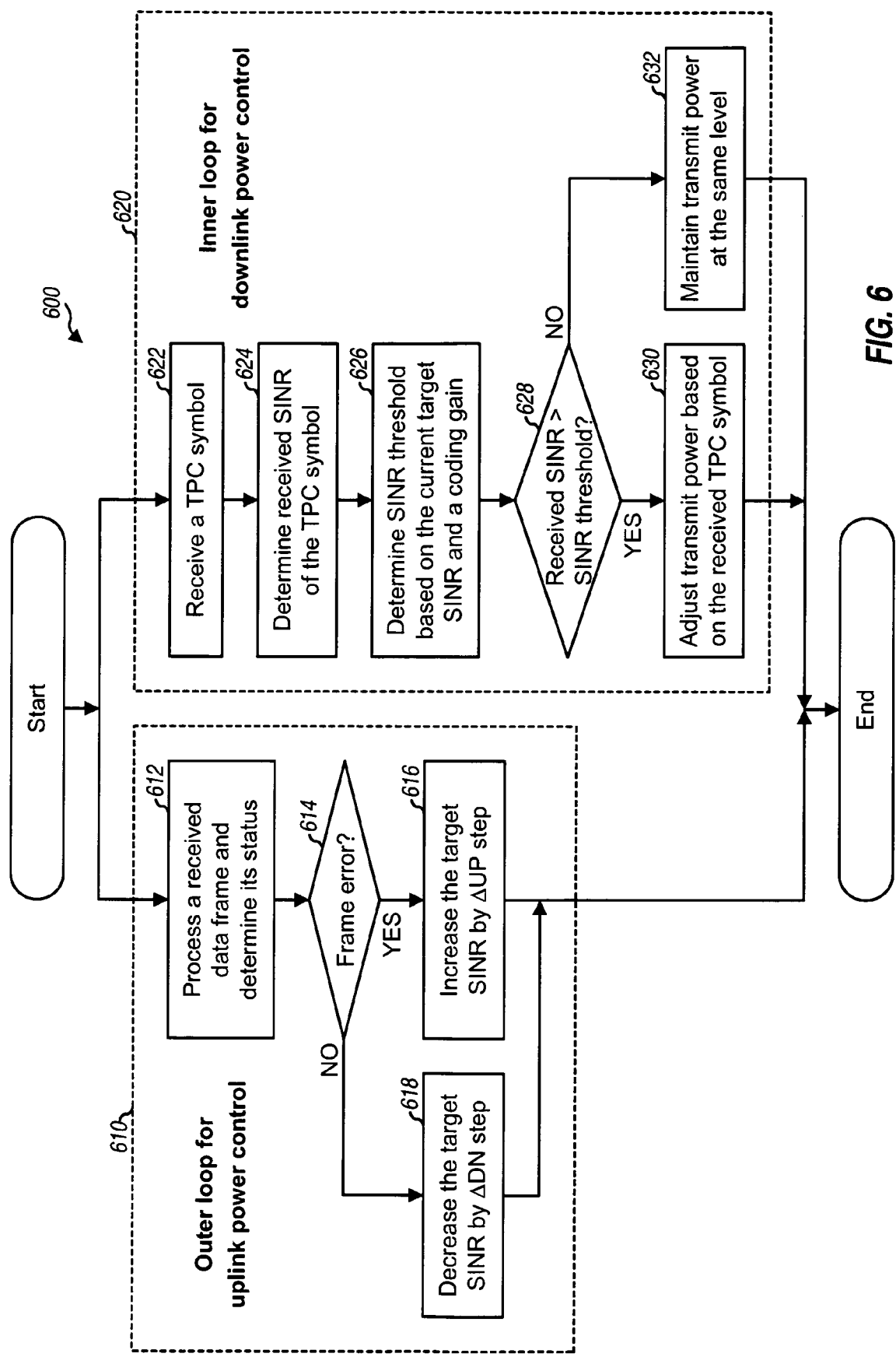
FIG. 6 shows a process for adjusting transmit power by accounting for reliability.

FIG. 6 shows an embodiment of a process 600 for downlink power control. Process 600 includes a block 610 for an outer loop for uplink power control and a block 620 for an inner loop for downlink power control. For block 610, whenever a data frame is received on the uplink, the received data frame is processed (e.g., demodulated, decoded, and checked) to determine its status (block 612). A determination is then made whether there was a frame error (block 614). If the answer is 'Yes', then the target SINR for uplink power control is increased by a ΔUP step (block 616). Otherwise, the target SINR is decreased by a ΔDN step (block 618).

For block 620, whenever a burst is received on the uplink, a TPC symbol is obtained from the burst (block 622), and the received SINR of the TPC symbol is determined (block 624). An SINR threshold may be determined based on the current target SINR and a coding gain for the burst, e.g., as shown in equation (2) (block 626). Alternatively, a static SINR threshold may be used. In any case, a determination is made whether the received SINR is greater than the SINR threshold (block 628). If the answer is 'Yes', then the transmit power for downlink transmission is adjusted up or down based on the received TPC symbol (block 630). Otherwise, the transmit power is maintained at the same level (block 632).

For clarity, FIG. 6 shows both the outer loop for uplink power control and the inner loop for downlink power control. The outer loop may be updated whenever a data frame is received, and the inner loop may be updated whenever a burst with TPC symbol is received. Since a data frame may be sent in multiple bursts, the inner loop may be updated at a faster rate than the outer loop.

In another embodiment, the transmit power is selectively adjusted based on unreliable TPC symbols. Correlation may exist from one TPC symbol to the next. For example, if the current TPC symbol is '1' and the previous TPC symbol is '0', then the transmit power should be maintained at the same level at the end of the two TPC symbols. If both of these TPC symbols are detected as unreliable and not used for transmit power adjustment, as described above, then there is no error in maintaining the transmit power at the same level due to the unreliable TPC symbols. However, if the current and previous TPC symbols are the same and are detected as unreliable, then the transmit power is incorrect if maintained at the same level for the two unreliable TPC symbols. The correlation between the two TPC symbols may be exploited to improve TPC performance.

In an embodiment, when two consecutive received TPC symbols are deemed as unreliable, these received TPC symbols are coherently combined to obtain a combined symbol. The magnitude of the combined symbol is indicative of the reliability of the symbol, and the sign of the combined symbol is indicative of the direction of transmit power adjustment. The magnitude of the combined symbol may be compared against a magnitude threshold $M_{th}$. If the combined symbol magnitude exceeds the magnitude threshold, then the transmit power may be adjusted up or down based on the sign of the combined symbol. The transmit power may be adjusted by one Up or Down step, by two Up or Down steps, or by some other amount if beneficial to recover from the lack of adjustment in the previous timeslot.

Table 4 shows four possible combinations of the current and prior TPC symbols and the action to perform for each combination.

TABLE 4

| Current TPC Symbol | Prior TPC Symbol | Action |
|---|---|---|
| Reliable | Reliable | Adjust transmit power based on current TPC symbol. |
| Reliable | Unreliable | Adjust transmit power based on current TPC symbol. |
| Unreliable | Reliable | Store current TPC symbol for next TPC symbol. |
| Unreliable | Unreliable | Combine current and prior TPC symbols and selectively adjust transmit power based on the combined symbol. |

Figure 7:
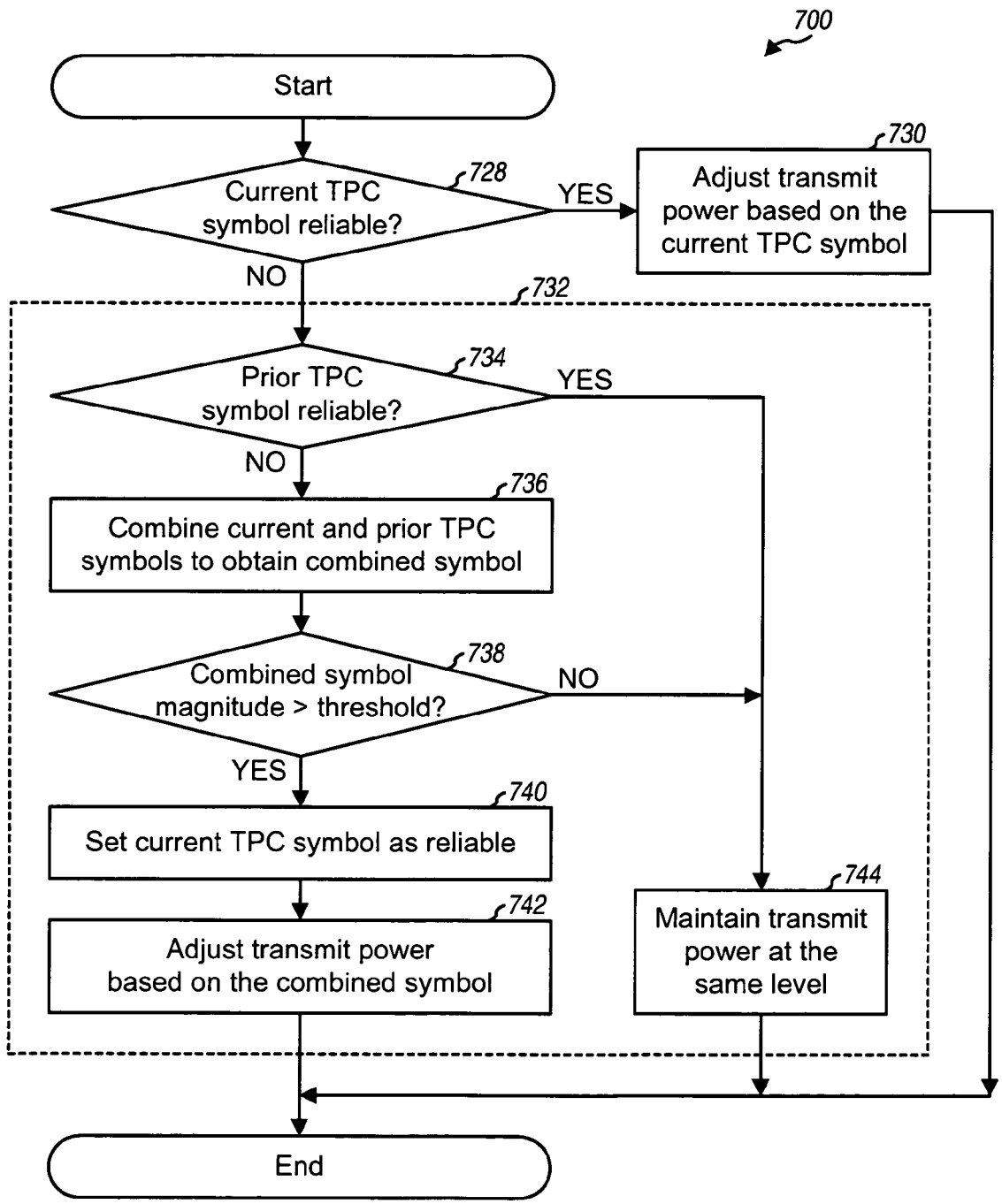
FIG. 7 shows a process for using unreliable TPC symbols for power control.

FIG. 7 shows an embodiment of a process 700 for selectively adjusting transmit power based on unreliable TPC symbols. Process 700 is part of the inner loop for downlink power control. Blocks 728, 730 and 732 of process 700 may be used for blocks 628, 630 and 632, respectively, of process 600 in FIG. 6.

In process 700, a determination is initially made whether the current TPC symbol is reliable (block 728). If the answer is 'Yes', then the transmit power is adjusted based on the current TPC symbol (block 730). Otherwise, a determination is made whether the prior TPC symbol is reliable (block 734). If the answer is 'No' for block 734, which means that the current and prior TPC symbols are both unreliable, then these two TPC symbols are coherently combined to obtain a combined symbol (block 736). A determination is then made whether the magnitude of the combined symbol exceeds the magnitude threshold (block 738). If the answer is 'Yes' for block 738, then the current TPC symbol is changed from unreliable to reliable so that it will not be combined with the next TPC symbol (block 740). The transmit power is then adjusted based on the sign of the combined symbol (block 742). The transmit power is maintained at the same level if the answer is 'Yes' for block 734 (since the prior TPC symbol was reliable and used for transmit power adjustment in the prior timeslot) or if the answer is 'No' for block 738 (since the combined symbol is not sufficiently reliable).

An accumulator may be used to store the previous TPC symbol if it is unreliable. The stored TPC symbol in the accumulator may be coherently combined with the current TPC symbol if it is also unreliable. The accumulator may be reset to zero if the current TPC symbol is reliable or if the magnitude of the combined symbol exceeds the magnitude threshold. The accumulator may store the current TPC symbol if it is unreliable and if the magnitude of the combined symbol is below the magnitude threshold.

The magnitude threshold $M_{th}$ may be determined as follows. A TPC symbol has two possible values of '1' and '0' and is transmitted as either $+\alpha$ or $-\alpha$, where $\alpha$ is a complex value. Two consecutive received TPC symbols may be expressed as:

$$TPC(k) = \pm\sqrt{E_k} + n(k),$$

and $$TPC(k-1) = \pm\sqrt{E_{k-1}} + n(k-1), \quad \text{Eq (3)}$$

where

TPC(k) is the current TPC symbol,
TPC(k−1) is the prior TPC symbol,
$E_k$ and $E_{k-1}$ are transmit power levels for the two TPC symbols, and
n(k) and n(k−1) are the noise observed by the two TPC symbols.

For simplicity, equation (3) assumes that the TPC symbols are transmitted as BPSK symbols, so that $+\alpha = +\sqrt{E_k}$ and $-\alpha = -\sqrt{E_k}$.

The received TPC symbols may be coherently combined, as follows:

$$TPC_{comb} = TPC(k) + TPC(k-1) \quad \text{Eq (4)}$$
$$= \pm\sqrt{E_k} \pm \sqrt{E_{k-1}} + n(k) + n(k-1)$$

where $TPC_{comb}$ is the combined symbol.

The combined symbol has a mean of $\pm\sqrt{E_k}\pm\sqrt{E_{k-1}}$, which depends on whether '1' or '0' was transmitted for each of the two TPC symbols. There are four possible cases corresponding to '00', '01', '10' and '11' for the two TPC symbols. The two cases of interest are when the two TPC symbols are the same. Thus, both TPC symbols may be assumed to be '1' (which may correspond to a plus sign for the combined symbol) or '0' (which may correspond to a minus sign for the combined symbol). If both TPC symbols are '1', then the mean of the combined symbol is $\sqrt{E_k}+\sqrt{E_{k-1}}$. The other two cases are (1) TPC(k) is '1' and TPC(k−1) is '0', which gives a mean of $\sqrt{E_k}-\sqrt{E_{k-1}}$, and (2) TPC(k) is '0' and TPC(k−1) is '1', which gives a mean of $\sqrt{E_{k-1}}-\sqrt{E_k}$. The nearest contender to deciding that two '1' were transmitted is the case with the larger mean among cases (1) and (2), which is case (1) if $E_k > E_{k-1}$ and case (2) if $E_{k-1} > E_k$.

A threshold may be used to determine whether '01', '10' or '11' was transmitted. Since the variance of the combined symbol is the same for all cases, the threshold may be set to the average of $\sqrt{E_k}+\sqrt{E_{k-1}}$ and the larger of $\sqrt{E_k}-\sqrt{E_{k-1}}$ and $\sqrt{E_{k-1}}-\sqrt{E_k}$. Thus, the threshold may be set to $\sqrt{E_k}$ if $\sqrt{E_k} > \sqrt{E_{k-1}}$ and to $\sqrt{E_{k-1}}$ if $\sqrt{E_{k-1}} > \sqrt{E_k}$, i.e., the larger amplitude of the two TPC symbols.

Since all symbols in a timeslot are sent at the same transmit power level, estimates of $\sqrt{E_k}$ and $\sqrt{E_{k-1}}$ may be obtained based on the average magnitude of the symbols received in timeslots k and k−1, respectively. The magnitude threshold $M_{th}$, may then be set based on the estimates of $\sqrt{E_k}$ and $\sqrt{E_{k-1}}$.

Computer simulations were performed for the power control embodiment shown in FIG. 7. The computer simulations indicate that the overall SER for TPC symbols is substantially reduced for various channel models and data rates, e.g., from 20% to 6% in some scenarios.

For clarity, the techniques have been described for downlink power control. A base station may perform process 600 in FIG. 6 and/or process 700 in FIG. 7 to adjust the transmit power for a terminal. The techniques may also be used for uplink power control. In this case, the terminal may perform process 600 and/or 700 to adjust the transmit power for the base station. The techniques may also be used for timing control for both the downlink and uplink. In these cases, the timing (instead of transmit power) is adjusted based on the received SS symbols.

Figure 8:
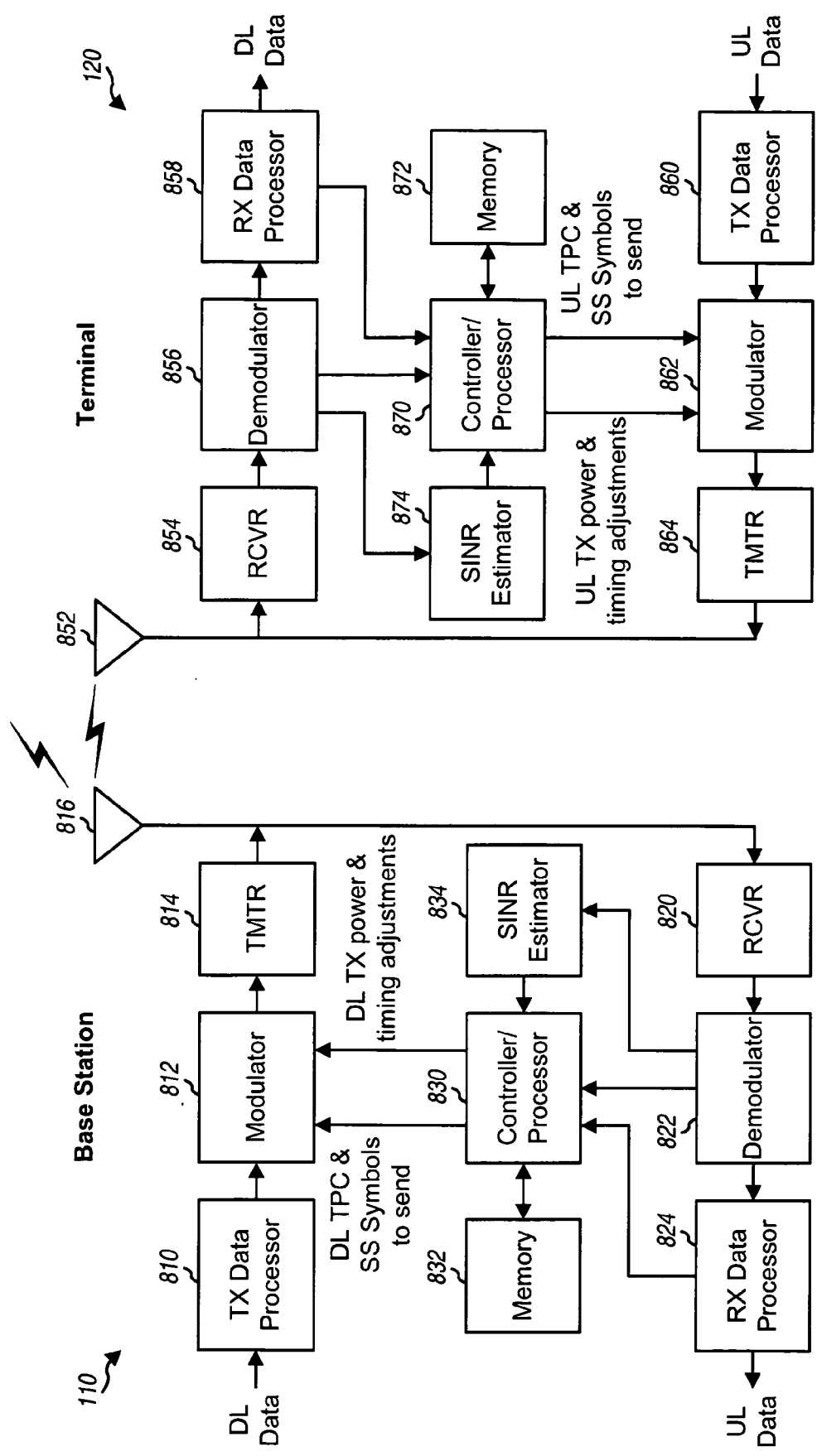
FIG. 8 shows a block diagram of a base station and a terminal.

FIG. 8 shows a block diagram of a base station 110 and a terminal 120, which are one of the base stations and one of the terminals in FIG. 1. At base station 110, a TX data processor 810 receives data frames (e.g., for the DTCH) and signaling frames (e.g., for the DCCH), processes (e.g., encodes and interleaves) each frame, and provides coded data. A modulator 812 processes the coded data to generate data symbols, processes control information (e.g., for TFCI, TPC, and SS) to generate control symbols, and provides bursts of data and control symbols. For UTRA TDD, the processing by modulator 812 may include spreading the data and control symbols with one or more Walsh codes and scrambling the spread symbols with a scrambling code. A transmitter (TMTR) 814 then processes the bursts to generate a downlink signal, which is transmitted from an antenna 816 to the terminals.

At terminal 120, an antenna 852 receives the downlink signal from base station 110 and provides a received signal to a receiver (RCVR) 854. Receiver 854 conditions and digitizes the received signal and provides samples. A demodulator 856 then processes (e.g., descrambles and despreads) the samples to obtain received symbols. An RX data processor 858 decodes the received data symbols for each data frame sent to terminal 120 and provides decoded data. RX data processor 858 further provides the status of each received data frame (e.g., good or erased) to a controller 870.

The processing for uplink transmission may be similar to the processing for the downlink transmission. The downlink and uplink processing for UTRA TDD is described in documents 3GPP TS 25.221 and TS 25.222. Controllers 830 and 870 direct the operations at base station 110 and terminal 120, respectively. Memories 832 and 872 store data and program codes for base station 110 and terminal 120, respectively.

For control symbol transmission, controller 830 and/or 870 may perform process 400 in FIG. 4 and determine whether to send control symbols with improved reliability.

For downlink power control, an SINR estimator 874 at terminal 120 may estimate the received SINR. Controller 870 may generate uplink (UL) TPC symbols based on the received SINR and a target SINR for downlink data frames. Controller 830 at base station 110 may implement process 600 in FIG. 6, process 700 in FIG. 7, and/or other processes to adjust the transmit power for terminal 120 based on the UL TPC symbols received from the terminal.

For uplink power control, an SINR estimator 834 at base station 110 may estimate the received SINR for terminal 120. Controller 830 may generate downlink (DL) TPC symbols based on the received SINR and a target SINR for uplink data frames from the terminal. Controller 870 at terminal 120 may implement process 600 in FIG. 6, process 700 in FIG. 7, and/or other processes to adjust the transmit power for base station 110 based on the DL TPC symbols received from the base station.

For uplink timing control, controller 870 may adjust the timing of uplink transmission to base station 110 based on DL SS symbols received from the base station. For downlink timing control, controller 830 may adjust the timing of downlink transmission to terminal 120 based on UL SS symbols received from the terminal. Controller 830 and/or 870 may implement processes similar to the ones shown in FIGS. 6 and 7 for timing control.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor to receive a control symbol in a burst sent with variable transmit power, to determine reliability of the control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER) to adjust a control loop if the control symbol is deemed reliable, and to maintain the control loop if the control symbol is deemed unreliable; and
    a memory coupled to the at least one processor.

2. The apparatus of claim 1, wherein the control symbol is a transmit power control (TPC) symbol and the control loop is for transmit power, and wherein the at least one processor adjusts the transmit power based on the TPC symbol if deemed reliable and maintains the transmit power if the TPC symbol is deemed unreliable.

3. The apparatus of claim 1, wherein the control symbol is a synchronization shift (SS) symbol and the control loop is for timing, and wherein the at least one processor adjusts the timing based on the SS symbol if deemed reliable and maintains the timing if the SS symbol is deemed unreliable.

4. The apparatus of claim 1, wherein the at least one processor determines the threshold based on a target received signal quality for data frames.

5. The apparatus of claim 4, wherein the at least one processor determines the threshold further based on a coding gain for a data frame sent in the burst.

6. The apparatus of claim 1, wherein the at least one processor determines a data rate of a data frame sent in the burst, determines a coding gain based on the data rate, and determines the threshold based on a target received signal quality for data frames and the coding gain.

7. The apparatus of claim 4, wherein the at least one processor adjusts the target received signal quality based on decoding results for received data frames.

8. The apparatus of claim 1, wherein the at least one processors uses a fixed value for the threshold, the fixed value being selected based on a target symbol error rate for control symbols.

9. A method comprising:
    receiving a control symbol in a burst sent with variable transmit power;
    determining reliability of the control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);

adjusting a control loop if the control symbol is deemed reliable; and maintaining the control loop if the control symbol is deemed unreliable.

10. The method of claim 9, further comprising:

determining the threshold based on a target received signal quality for data frames and a coding gain for a data frame sent in the burst.

11. An apparatus comprising:

means for receiving a control symbol in a burst sent with variable transmit power;

means for determining reliability of the control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);

means for adjusting a control loop if the control symbol is deemed reliable; and means for maintaining the control loop if the control symbol is deemed unreliable.

12. The apparatus of claim 11, further comprising:

means for determining the threshold based on a target received signal quality for data frames and a coding gain for a data frame sent in the burst.

13. A processor readable media for storing instructions operable to:

receive a control symbol in a burst sent with variable transmit power;

determine reliability of the control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);

adjust a control loop if the control symbol is deemed reliable; and maintain the control loop if the control symbol is deemed unreliable.

14. The processor readable media of claim 13, and further for storing instructions operable to:

determine the threshold based on a target received signal quality for data frames and a coding gain for a data frame sent in the burst.

15. An apparatus comprising:

at least one processor to receive control symbols in a burst, to identify each received control symbol as a reliable control symbol or an unreliable control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER), to adjust a control loop based on reliable control symbols, to combine unreliable control symbols to obtain combined symbols, and to selectively adjust the control loop based on the combined symbols; and a memory coupled to the at least one processor.

16. The apparatus of claim 15, wherein the control symbols are synchronization shift (SS) symbols and the control loop is for timing, and wherein the at least one processor adjusts the timing based on reliable SS symbols and selectively adjusts the timing based on the combined symbols.

17. The apparatus of claim 15, wherein the control symbols are transmit power control (TPC) symbols and the control loop is for transmit power, and wherein the at least one processor adjusts the transmit power based on reliable TPC symbols and selectively adjusts the transmit power based on the combined symbols.

18. The apparatus of claim 17, wherein the at least one processor combines two consecutive received TPC symbols identified as unreliable TPC symbols to obtain a combined symbol, adjusts the transmit power if magnitude of the combined symbol exceeds a threshold, and maintains the transmit power if the magnitude of the combined symbol does not exceed the threshold.

19. The apparatus of claim 18, wherein the at least one processor selects the threshold based on transmit power levels of the two consecutive received TPC symbols.

20. The apparatus of claim 18, wherein the at least one processor determines a larger transmit power level among the two consecutive received TPC symbols, and sets the threshold based on the larger transmit power level.

21. The apparatus of claim 17, wherein the at least one processor adjusts the transmit power by a first up step or a first down step for each reliable TPC symbol, and adjusts the transmit power by a second up step or a second down step for each combined symbol with magnitude exceeding a threshold.

22. The apparatus of claim 21, wherein the second up step is twice the first up step, and wherein the second down step is twice the first down step.

23. A method comprising:

receiving control symbols in a burst;

identifying each received control symbol as a reliable control symbol or an unreliable control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);

adjusting a control loop based on reliable control symbols;

combining unreliable control symbols to obtain combined symbols; and selectively adjusting the control loop based on the combined symbols.

24. The method of claim 23, wherein the control symbols are transmit power control (TPC) symbols and the control loop is for transmit power.

25. The method of claim 24, wherein the combining the unreliable control symbols comprises combining two consecutive received TPC symbols identified as unreliable TPC symbols to obtain a combined symbol, and wherein the selectively adjusting the control loop comprises adjusting the transmit power if magnitude of the combined symbol exceeds a threshold, and maintaining the transmit power if the magnitude of the combined symbol does not exceed the threshold.

26. The method of claim 24, wherein the adjusting the control loop based on the reliable control symbols comprises adjusting the transmit power by a first up step or a first down step for each reliable TPC symbol, and wherein the selectively adjusting the control loop based on the combined symbols comprises adjusting the transmit power by a second up step or a second down step for each combined symbol with magnitude exceeding a threshold.

27. An apparatus comprising:
means for receiving control symbols in a burst;
means for identifying each received control symbol as a reliable control symbol or an unreliable control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);
means for adjusting a control loop based on reliable control symbols;
means for combining unreliable control symbols to obtain combined symbols; and
means for selectively adjusting the control loop based on the combined symbols.

28. The apparatus of claim 27, wherein the means for combining the unreliable control symbols comprises means for combining two consecutive received control symbols identified as unreliable control symbols to obtain a combined symbol, and wherein the means for selectively adjusting the control loop comprises means for adjusting the control loop if magnitude of the combined symbol exceeds a threshold, and means for maintaining the control loop if the magnitude of the combined symbol does not exceed the threshold.

29. A processor readable media for storing instructions operable to:
receive control symbols in a burst;
identify each received control symbol as a reliable control symbol or an unreliable control symbol based on received signal quality of the control symbol and a dynamic signal-to-interference-plus-noise ratio (SINR) threshold based on a target SINR threshold and a difference between a first SINR required to obtain a target frame error rate (FER) and a second SINR required to achieve a target symbol error rate (SER);
adjust a control loop based on reliable control symbols;
combine unreliable control symbols to obtain combined symbols; and
selectively adjust the control loop based on the combined symbols.

30. The processor readable media of claim 29, and further for storing instructions operable to:
combine two consecutive received control symbols identified as unreliable control symbols to obtain a combined symbol,
adjust the control loop if magnitude of the combined symbol exceeds a threshold, and
maintain the control loop if the magnitude of the combined symbol does not exceed the threshold.

\* \* \* \* \*